July 2, 1935.   J. G. JONES ET AL   2,006,458
METHOD OF WELDING SPOOLS
Filed Aug. 1, 1933    2 Sheets-Sheet 1
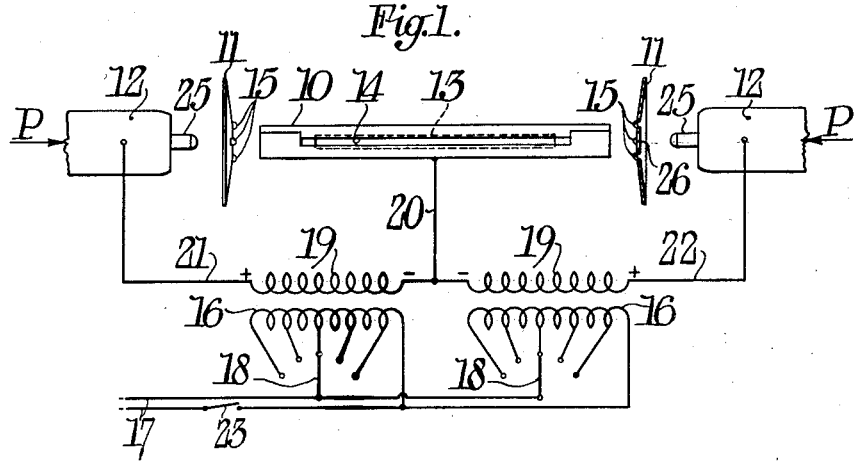
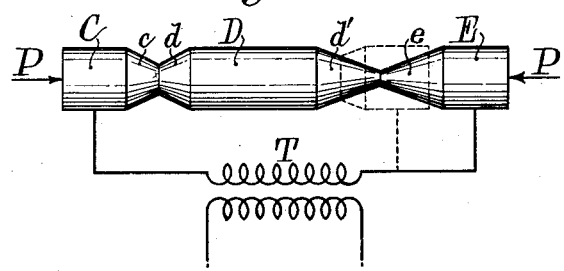
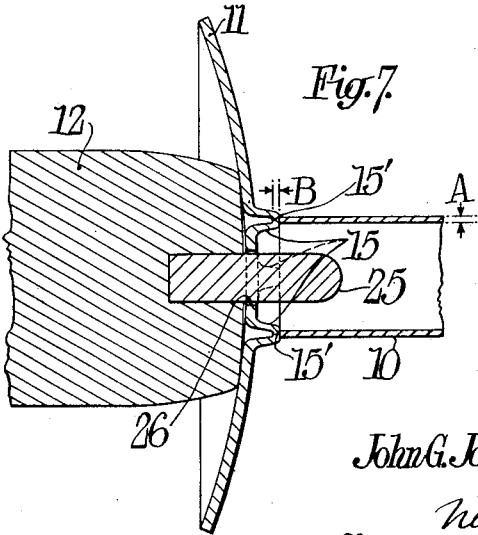
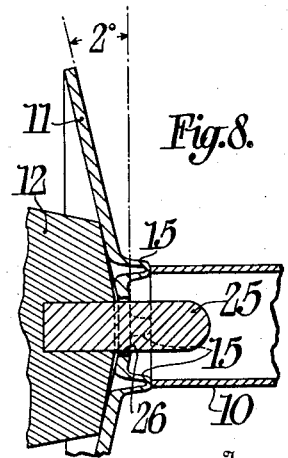
Inventors:
John G. Jones & Haywood G. Dewey,
By Newton M. Perrins
George A. Gillette, Jr.
Attorneys July 2, 1935.  J. G. JONES ET AL  2,006,458
METHOD OF WELDING SPOOLS
Filed Aug. 1, 1933   2 Sheets-Sheet 2
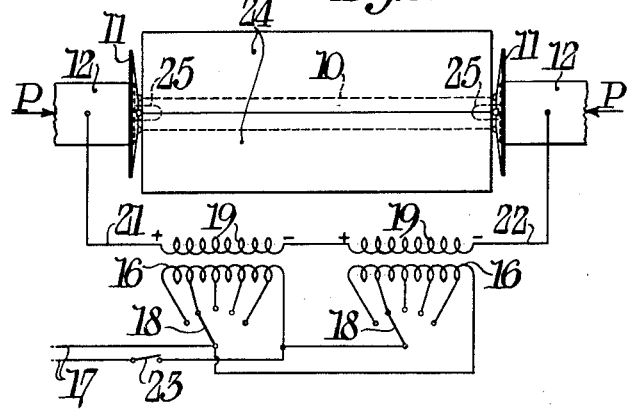
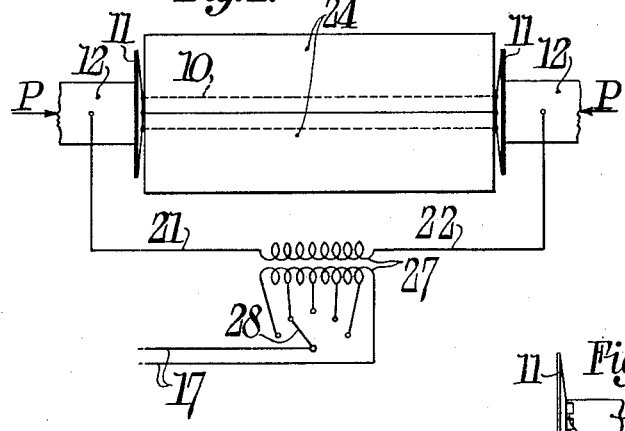
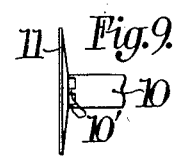
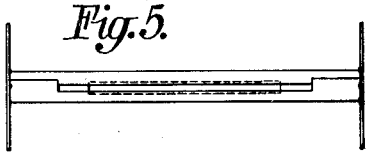
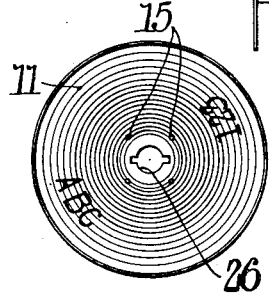
Inventors:
John G. Jones & Haywood G. Dewey,
By Newton M. Perries
George A. Gillette, Jr.
Attorneys Patented July 2, 1935

2,006,458

UNITED STATES PATENT OFFICE 2,006,458

METHOD OF WELDING SPOOLS

John G. Jones and Haywood G. Dewey, Rochester, N. Y., assignors to Eastman Kodak Company, Rochester, N. Y., a corporation of New York Application August 1, 1933, Serial No. 683,154

2 Claims. (Cl. 219—10)

The present invention relates to a method of making metal spools and more particularly to a method of electrically and simultaneously welding the flanges of said spools to the ends of the cores.

The method of the present invention is an improvement over the method of joining spool members employed by our Automatic film spool making machine disclosed in Patent #1,616,973. According to said patent, the metal flanges are individually and successively welded to the respective ends of the cores.

The primary object of the present invention is the provision of a method for joining metal flanges and cores to form all-metal spools in which the flanges are simultaneously and electrically welded to the respective ends of the cores.

Another object of the present invention is the provision of the step of deforming or dishing the flanges previous to the welding operation so that upon cooling the flanges are substantially plain or flat.

A further object of the present invention is the provision of parallel and series circuits for electrically and simultaneously joining the flanges to the cores.

Other objects of the invention will be suggested to those skilled in the art as the disclosure of our invention is developed hereinafter.

The general opinion of electric welding experts was that simultaneous welding of the metal flanges to the cores could not be accomplished. However, the prospective economies of such a method, both in time and electrical energy, were so attractive that an investigation as to the possibilities of simultaneously welding the flanges was instituted. Furthermore, the successive welding of the flanges would create distortion of the cores because of the successive heating of respective core ends and would also require more energy to attain a welding temperature at the juncture of the flange and core because of the conduction of heat by the core away from said juncture. Therefore, simultaneous electric welding of the flanges to the cores was undertaken and was found to be feasible and economical in practice.

Ordinarily the metal flanges are more or less distorted upon cooling because of the intense heating of the central portion of the flange by the welding current to produce an extremely variable temperature gradient across the flange. Such distortion of the flanges during cooling may be overcome by clamping the flanges between flat jaws but this would introduce a time lag into the procedure. According to the present invention this distortion of the flanges during cooling is overcome or compensated by preforming or dishing the flanges before the welding operation takes place so that during cooling the flanges become substantially flat or plane. Conical or convex surfaces of the dish-shaped flanges are adjacent the ends of the spool core so that the aforementioned planeness of the flanges will result upon cooling.

The path of the welding current or currents through the core and flanges is also an important consideration. While the employment of parallel welding circuits and their simultaneous energization according to the present invention, eliminates the loss of energy due to conduction by the core away from the joints to be welded, however, the use of a single series welding circuit through the spool presents other advantages such as the elimination of certain variable contact resistances, uniformity of the welded joints, and the simplification of the machine employed.

Reference is made to the accompanying drawings, which illustrate the manner of accomplishing the method of the present invention, in the several views of which similar reference numerals designate similar elements, and in which:

Fig. 1 is a side elevation of a welding station showing the preliminary positions of the core, flanges and the welding electrodes and showing a parallel connection of the core and electrodes to a pair of welding transformers.

Fig. 2 is a side elevation of a plurality of rods being welded together by a series circuit.

Fig. 3 is a side elevation of a welding station showing the core, flanges and electrodes in readiness for welding and showing a series circuit through the core, flanges, electrodes and a pair of transformers.

Fig. 4 is also a side elevation of a welding station showing the positions of the core and flanges after completion of the welds but before cooling and showing a series circuit through the core, flanges, electrodes and a single welding transformer.

Fig. 5 is a side elevation of a finished spool.

Fig. 6 is a plan view of a flange before attachment by welding to the core.

Figs. 7 and 8 are fragmentary sections to enlarged scale taken through one end of the spool just prior to welding.

Fig. 9 is a fragmentary elevation of a modified form of spool.

Prior to the welding operation, the core 10, flanges 11, and electrodes 12 are located in spaced relation at the welding station, see Fig. 1. The core 10 is provided with a slot 13 and with a longer, narrower and diametrically opposed slot 14 formed by the edges of the sheet material from which the core 10 is rolled. The core 10 is preferably constructed according to Patent #1,648,539 issued to Benjamin D. Chamberlin on November 8, 1927.

The flanges 11 are provided with a plurality of projections 15 which may be stamped from the flange material. In order to obtain the most uniform current density through the heated portions of the spool and for optimum welding conditions, it is quite essential that the top portions 15' of projections 15, see Fig. 7, be equal in thickness to the thickness of the core 10. The thickness of these sections of core 10 and flange 11 are indicated by the dimensions A and B, respectively, in Fig. 7. The side walls of projections 15 are tapered toward the top portions 15' of definite thickness. In short, the projections 15 are preferably formed and proportioned identically to the projections formed on the flanges according to Patent #1,754,205 issued to John G. Jones on April 8, 1930.

The electric welding current may be supplied to the spool either in parallel or in series. A parallel circuit is diagrammatically illustrated in Fig. 1. A pair of transformers with multiple tap primaries 16 are connected in parallel to the supply mains 17 through switch arms 18 which are adjustable to vary the portions of the transformer primaries 16 across the mains 17. The transformer secondaries 19 have one set of ends of like polarity connected together and to the core 10 by a wire 20 while the other set of ends are connected to respective electrodes by leads 21 and 22. Thus, when the electrodes 12 and flanges 11 are moved to abut the ends of core 10 and when main switch 23 is closed, two parallel circuits will be established, one from secondary 19, lead 21, the left electrode 12, the left flange 11, the left portion of core 10, and wire 20 to the other side of secondary 19, and the other from the other secondary 19, lead 22, the right electrode 12, the right flange 11, the right portion of core 10, and wire 20 to the other side of the secondary 19. Both of these circuits will be simultaneously energized and the two joints between the flanges 11 and the ends of core 10 will be simultaneously welded.

It is obvious that the two welds will be completed much sooner than if made successively and also that relatively little energy will be lost by conduction to cool portions of the spool.

A series circuit for the welding current through the electrodes, flanges and core is still more advantageous as will be explained with respect to Figure 2. For purposes of demonstration, a plurality of round rods C, D, and E have their ends drawn out to form tapered ends $c$, $d$, $d'$ and $e$, the end areas of tapered ends $c$ and $d$ being equal and the end areas of tapered ends $d'$ and $e$ being equal but less than the end areas of tapered ends $c$ or $d$. The rods C, D and E are placed end to end with tapered ends $c$, $d$, and $d'$, $e$, in contact with each other and a resilient end pressure P is applied to the ends of rods C and E while the secondary of a transformer T is connected to rods C and E.

It is elementary that the current value is the same throughout all portions of a series circuit and therefore the greatest current density will exist at the place of least area in the circuit, which in the example selected is at the plane of contact between tapered ends $d'$ and $e$. The current in the circuit, being of sufficient magnitude for welding, will also produce the greatest heating effect at said place of least area and tapered ends $d'$ and $e$ will be the first to attain a molten condition.

The end pressure P will now move rods D and E toward each other at the same time increasing the area of contact between the tapered ends $d'$ and $e$. When the area of contact between the ends $d'$ and $e$ becomes equal to the area of contact between ends $c$ and $d$, then the current densities in these areas of contact will be equal and the welding temperatures at each joint will be approximately equal. If there is any inertia to the melting reaction, then the tapered ends $d'$ and $e$ will increase in size to the extent indicated by the dotted lines in Figure 2 and the area of contact between ends $d'$ and $e$ will be greater than the area of contact between ends $c$ and $d$. Whereupon the ends $c$ and $d$ will be heated until molten and moved together to increase the area of contact between them. The shifting of the heating effect from one joint to the other is practically instantaneous and the heating reactions soon become balanced so that equal current densities and equal welded areas are obtained at each joint. Any variation in contact resistances between the ends of the rods will cause the same result as inequality of end areas so that as a result uniformity of the welds at each joint is obtained.

The advantages of the series welding procedure, as applied to joining the flanges 11 or projections 15 on the flanges 11 to the core 10, are obvious and have been previously enumerated. As illustrated in Fig. 3 the core 10 is held by the jaws 24 while the electrodes 12 are moved by the resilient pressure P towards the ends of core 10. In the course of their travel, electrodes 12 pick up the flanges 11 having for this purpose centering pins 25 which enter apertures 26 provided in the center of flanges 11. The flanges 11 are carried towards the core 10 so that projections 15 are in abutting relation to the ends of core 10.

One form of circuit for series welding is shown in Fig. 3. The secondaries 19 of the transformers have one set of ends connected together, while, as in Fig. 1, one end of one secondary 19 is connected by a lead 21 to one electrode 12 and the other end of the other secondary 19 is connected by a lead 22 to the other electrode 12. This circuit is similar to that shown in Fig. 1 except for the removal of wire 20. The polarity of one secondary 19 must be reversed, however, and may be accomplished by reversing the connection for one primary 16 across the supply mains 17. Closure of main switch 23 will institute the welding action explained in connection with Figure 2.

Alternatively, a single transformer 27 of larger capacity may be employed with one end of its secondary connected by a lead 21 to one electrode 12 and the other end of its secondary connected by a lead 22 to the other electrode 12. The primary of transformer 27 has multiple taps and is connected across the supply mains 17 by a switch arm 28 so that any portion of the primary winding may be utilized.

Upon the application of the welding current either in series or in parallel, the projections 15 of flanges 11 and the adjacent portions of core 10 become molten and flow together. The union of the molten portion of the spool is promoted and facilitated by the end pressure P which moves the flanges 11 into abutment with the ends of core 10, as shown in Fig. 4.

An obvious variation for the provision of the welding projections is shown in Fig. 9. The core 10 is provided with a plurality of projections 10' which are adapted to abut against the flange 11 and which are adapted to unite with molten portions of flange 11 upon the application of the welding current.

The two parallel welding circuits should be electrically balanced and a balance may be approximated by insuring that the leads 21 and 22 are of equal length and that the wire 20 contacts the middle point of the core and is connected to the middle point of the connected ends of the secondaries 19. However, the contact resistance between the core 10 and wire 20 may vary with the location of each new core in the welding station. This balancing of the circuits, the connection to core 10 and the corresponding variable contact resistance is eliminated in the series welding circuit and the welding station is simplified because it is not necessary to make a contact with each new core to be welded.

If the flanges 11 are supplied with plane surfaces, the expansion and contraction in the material of the flange due to the localized heating and cooling of the flange will result in irregular distortion thereof and the flanges of the finished spool will be warped. Such distortion or warping of the flanges may be practically eliminated by pre-forming the flanges. Pre-formation of the flanges so that they will be substantially flat after welding may consist in dishing the flanges to form a convex or a conical surface which is brought adjacent the ends of core 10. The flange 11 may be dished spherically so that a truly convex surface is adjacent the end of core 10, see Fig. 7, or the flange 11 may be dished conically so that a conical surface is adjacent the end of core 10, see Fig. 8. The conical pre-formation of flange 11 is preferred because the tools to form the same will be less expensive than the tools to form the convexly dished flange 11.

It is not certain that the stamping of the legend and the forming of the projections in the flanges will result in dishing of the flange with a concave surface toward the legend and a convex surface toward the projections. Furthermore, there is generally a curl or curvature in the flange due to the curl in the strip stock furnished in rolls or coils and from which the flanges are formed. Therefore, since the curvature of the flange is not predictable and may be in either direction and of varying amounts, it is preferred positively to form a dish in the flange of predetermined amount and direction. The distorting action of the weld plus the pressure of the electrode is then relied upon to bring the flanges to a substantially flat condition. In practice there is no objection to a slight residual dish in the flange because such an outward flare in the flange facilitates subsequent spooling and winding of strip material to and from the finished spool.

Legends of required nature, such as shown in Fig. 6, may be stamped in the dished surface of the flange. It will be found most economical to form the projections 15 on the flange, to stamp the legends on one surface of the flange, and to dish the flange in a single operation. The strains set up in one surface of the flange by formation of projections 15 and by stamping of the legends will assist in the pre-forming or dishing of the flanges in the required direction, that is, with the legends on the resulting dished surface and with the projections 15 protruding from the resulting conical or convex surface of the flange.

The resulting flatness of the flanges upon cooling has been established as a matter of practice. The theory underlying the result has not been authoritatively determined, but it is suggested that the heating of the flange releases the strains set up therein by dishing and/or stamping, or that the core upon cooling draws the central portion of the surface of the flange together, or that both effects take place. The amount of preforming or degree of dishing necessary is best established by experiment, but a 2° angle for the conical surface of the flange, as indicated in Fig. 8, has been found to be quite satisfactory in actual operation.

The ends of electrodes 12 which abut against the dished surfaces of the flanges are also conical or convex, but have a contour slightly flatter than the flanges and illustrated in Figs. 7 and 8. A 1° angle for the conically formed ends of electrodes 12 has been found to be adequate. It is also possible that this difference in contour of the flanges and ends of electrodes 12 may contribute to the flattening of the flanges upon cooling.

The welding operation according to the method of the present invention is accomplished in the following manner: The core 10 is held in position, preferably by a pair of jaws 24, and the electrodes 12 are moved toward the ends of core 10. The flanges 11 are supported upon the centering pins 25 of electrodes 12 and the projections 15 which protrude from the conical or convex surfaces of the flanges 11 are moved into contact with the ends of core 10. This relative position of the core 10, flanges 11 and electrodes 12 is shown in Figs. 3 and 7. A resilient pressure P is exerted in an axial direction upon the electrodes 12 and is diagrammatically indicated by arrows in Figs. 1, 3 and 4.

The welding current is passed through the core 10, flanges 11 and electrodes 12, such welding current may be supplied simultaneously to parallel circuits through the flanges and in opposite directions through the core 10 but is preferably supplied to a single series circuit to flow simultaneously and in the same direction through both abutting joints between the flanges 11 and the core 10. The projections 15 and adjacent portions of core 10 become molten and flow together to form the weld, this condition is illustrated in Figure 4.

Upon interruption of the welding current, the flanges cool and the dished formation of the flanges disappears so that the finished spool has flat flanges 11, as illustrated in Fig. 5.

The welding circuits shown are particularly described with respect to an alternating current source of electrical energy since the necessarily high welding currents may be readily obtained by the use of one or more transformers and the indicated characteristics of the circuits, such as polarity and directions, are instantaneous values only. However, it is to be clearly understood that it would be obvious to substitute a source of direct current electrical energy in place of the secondary or secondaries of the transformers shown. It is also pointed out that any of the single steps of the method of the invention may be quite advantageously employed per se for other welding operations so that the scope of our invention is not to be limited by the disclosure but only by the appended claims.

Having now particularly described our invention what we desire to secure by Letters Patent of the United States and what we claim is:

1. A method of joining metal flanges and a metal core to form a spool with flat flanges, which comprises dishing said flanges, forming a plurality of projections on each flange, electrically welding said projections on each flange to the opposite ends of said core, and cooling the welded spool whereupon the flanges become substantially flat.

2. A method of joining metal flanges and a metal core to form a spool with flat flanges, which comprises dishing said flanges into a convex formation, forming a plurality of projections from the convex surface of each flange, electrically welding said projections on each flange to the opposite ends of said core, and cooling the welded spool whereupon the flanges are substantially flattened.

JOHN G. JONES.
HAYWOOD G. DEWEY.